United States Patent Office  2,956,333
Patented Oct. 18, 1960

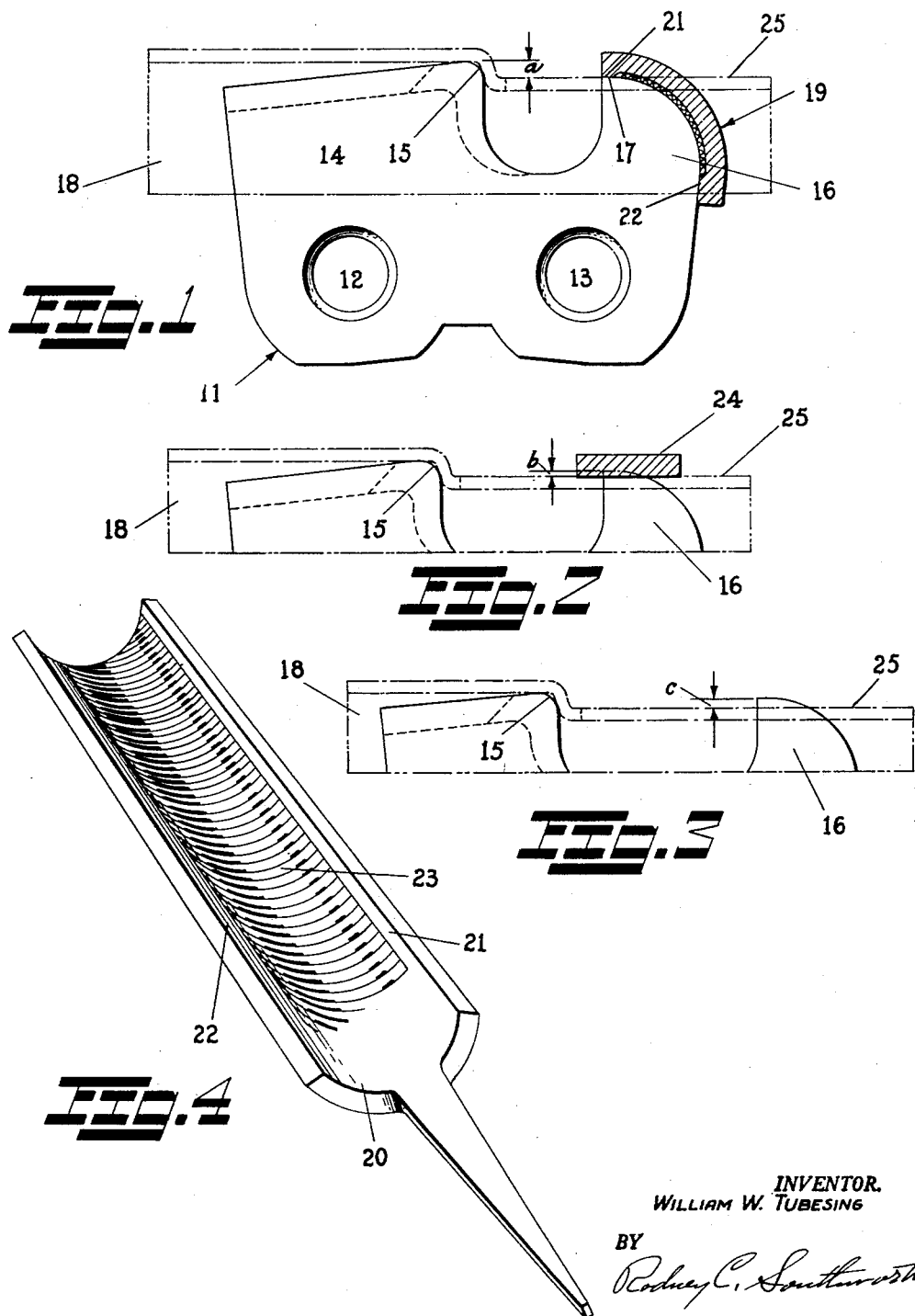

2,956,333

FILE FOR SAW CHAIN

William W. Tubesing, Hopedale, Mass., assignor to Draper Corporation, Hopedale, Mass., a corporation of Maine Filed Jan. 2, 1959, Ser. No. 784,590

1 Claim. (Cl. 29—78)

This invention relates to a file for a saw chain and, in particular, to a file for the depth gauge of router or cutter links of such chains.

It is a principal object of this invention to provide a file which will impart a predetermined curvature to the depth gauge of router links for saw chains without disturbing a previously established clearance between the depth gauge terminus and the cutting edge of the link.

It is a further object to provide a file having a concave working surface whose cutting area extends only over a portion of that surface, the remainer thereof being smooth and constituting non-cutting or gauging surfaces so that it is impossible to file inadvertently beyond predetermined limits.

Further objects and advantages will appear from the description to follow.

Many saw chains presently in use with power chain saws include a plurality of longitudinally spaced apart cutter elements or links including a toe portion which extends transversely of the chain and slants downwardly toward the rear of the link. The leading edge of the toe portion is provided with a cutting edge and a depth gauge is provided between each of the cutter elements whose main function is to regulate the depth of cut thereof. The distance between a plane defined by the cutting edges of a pair of successive teeth of a straightened chain and the terminus of the depth gauge spaced therebetween is known as the depth gauge clearance. It will be apparent that as the cutting edges are resharpened the depth gauge clearance will diminish by reason of the downward slant of the toe portion, unless the depth gauges are also filed down. The amount of depth gauge clearance is important to the efficiency of a chain and ordinarily should be adjusted each time the cutting edges of the router links are sharpened.

It is further desirable to maintain a predetermined curvature on the leading edge of the depth gauge since the stability of the chain is thereby increased.

Heretofore, after sharpening of the cutting edges of the links the depth gauge terminus is filed to re-establish the proper clearance. After a number of sharpenings, the proper curvature on the depth gauge leading edge is destroyed, or, should an attempt be made to re-establish this curvature with known files, it is almost inevitable that the terminus of the gauge is inadvertently filed further, thereby increasing the previously established clearance.

According to the invention, a file has been devised having an inner concave working surface, said surface including smooth non-cutting portions extending lengthwise of the file along both extremities of the concavity, the area therebetween comprising the cutting portion of the file. With one of these smooth portions in position over the terminus of the gauge and the other adjacent the leading edge of the gauge, the proper curvature can be cut on the gauge without filing beyond desired limits.

A more complete understanding of the invention may be had by reference to the accompanying drawings and the following specification.

In the drawings,

Fig. 1 is a side elevational view of a router link including a cross section of the novel file of the invention in position over the depth gauge at the completion of the filing thereof;

Fig. 2 is a side elevation of a portion of the router link of Fig. 1 after the cutting edge of the link has been filed back, indicating the need for further filing of the terminus of the depth gauge in order to re-establish the proper clearance;

Fig. 3 is a view similar to Fig. 2 where the cutting edge has been filed back still further; and Fig. 4 is a perspective of the novel file of the present invention.

In the drawings, 11 denotes a router or cutter link for a saw chain which link includes rivet holes 12 and 13, toe portion 14 having a cutting edge 15 which slopes downwardly toward the rear of the link. A depth gauge 16 is formed on the forward end of the link and is conventionally rounded as shown in order to permit more stable operation of the chain. In Fig. 1 the terminus 17 of the depth gauge is shown as providing the proper clearance "a" as determined by a filing gauge 18 of known construction. A concave file denoted generally at 19 is shown in place on the depth gauge at the completion of the filing operation.

This file is shown perspectively in Fig. 4 and comprises a concave surface 20 which describes an arc of approximately 90 degrees or slightly greater since the leading edge of the cutter link slopes rearwardly from the vertical at an angle of about 6 degrees. The file includes smooth, non-cutting portions 21 and 22 which extend lengthwise along both extremities of the concave surface 20. The area 23 therebetween comprises the cutting portion of the file. The outer surface of the cutting portion 23 should form a continuous arc endwise of the file with the smooth portions 21 and 22 as seen more clearly in Fig. 1.

Fig. 2 shows the cutter link after the cutting edge 15 has been filed back thus destroying the desired clearance and indicating an amount "b" to be removed from the terminus of the depth gauge in order to re-establish the clearance.

The filing of the depth gauge is done in two steps. First, a flat file 24 is used to bring the terminus 17 down to coincide with the surface 25 of the filing gauge 18. The file 19 is then utilized to reform the proper curvature upon the leading edge of the depth. As soon as the smooth portions 21 and 22 of the file come into contact with the depth gauge, no further filing is possible and it is therefore impossible to destroy the clearance which has already been established.

In Fig. 3 the cutting edge 15 has been filed further back than in Fig. 2 indicating an additional amount "c" to be removed from the depth gauge terminus.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claim.

I claim:

For use on depth gauges of saw chains, said depth gauges including a substantially horizontal upper edge, a substantially vertical leading edge, and an arcuate portion therebetween, a file which comprises an elongated member having a lateral cross section describing an arc of about 90° and defining an inner concave working surface, said surface including a pair of non-cutting file guiding portions extending lengthwise of said member along both edges of said inner concave working surface in planes at substantially right angles to each other whereby one of said non-cutting portions is adapted to guide said member along said horizontal upper edge and the other of said portions is adapted to guide said member along said vertical leading edge, the area between said non-cutting portions comprising the cutting portion of said file.

References Cited in the file of this patent

UNITED STATES PATENTS

| | | |
|---|---|---|
| 440,017 | Comstock | Nov. 4, 1890 |
| 1,528,177 | Adams | Mar. 3, 1925 |
| 2,229,710 | Tuggle | Jan. 28, 1941 |
| 2,493,039 | Sochia | Jan. 3, 1950 |
| 2,687,562 | Noll | Aug. 31, 1954 |
| 2,838,828 | Nordstrom | Jan. 17, 1958 |

FOREIGN PATENTS

| | | |
|---|---|---|
| 16,317 | Great Britain | Aug. 31, 1895 |
| 513,575 | Germany | Nov. 29, 1930 |